US009784816B2

(12) United States Patent
Jalali

(10) Patent No.: US 9,784,816 B2
(45) Date of Patent: Oct. 10, 2017

(54) SYSTEMS AND METHODS OF LOCATION AND TRACKING

(71) Applicant: Ubiqomm, LLC, Rancho Santa Fe, CA (US)

(72) Inventor: Ahmad Jalali, Rancho Santa Fe, CA (US)

(73) Assignee: Ubiqomm LLC, San Diego, CA (US)

( * ) Notice: Subject to any disclaimer, the term of this patent is extended or adjusted under 35 U.S.C. 154(b) by 648 days.

(21) Appl. No.: 14/284,384

(22) Filed: May 21, 2014

(65) Prior Publication Data
US 2015/0241551 A1   Aug. 27, 2015

Related U.S. Application Data

(60) Provisional application No. 61/944,115, filed on Feb. 25, 2014.

(51) Int. Cl.
| | |
|---|---|
| *G01S 3/02* | (2006.01) |
| *G01S 5/14* | (2006.01) |
| *G06K 7/10* | (2006.01) |
| *G01S 13/74* | (2006.01) |
| G07C 9/00 | (2006.01) |
| G01S 5/00 | (2006.01) |
| H04W 64/00 | (2009.01) |

(52) U.S. Cl.
CPC ............. *G01S 5/14* (2013.01); *G01S 13/74* (2013.01); *G06K 7/10009* (2013.01); *G01S 5/00* (2013.01); *G07C 9/00111* (2013.01); *H04W 64/00* (2013.01)

(58) Field of Classification Search
CPC .. G01S 5/00; G01S 5/14; G01S 13/74; H04W 4/02; H04W 64/00; G07C 9/00111; G06K 7/10009
USPC ............................ 342/451, 464; 340/539.13
See application file for complete search history.

(56) References Cited

U.S. PATENT DOCUMENTS

| | | | | |
|---|---|---|---|---|
| 7,228,228 B2 * | 6/2007 | Bartlett | ..................... | G01S 1/08 340/539.13 |
| 7,558,852 B2 * | 7/2009 | Douglas | ................ | G01S 5/0252 455/404.2 |
| 8,219,094 B2 * | 7/2012 | Huber | ................ | G06Q 20/1235 455/436 |
| 8,253,538 B1 | 8/2012 | Chu | | |
| 8,294,554 B2 * | 10/2012 | Shoarinejad | ............ | G01S 7/003 340/10.1 |
| 8,344,949 B2 * | 1/2013 | Moshfeghi | ............ | G01S 5/0263 342/457 |
| 8,565,133 B2 | 10/2013 | Chen | | |
| 8,611,321 B2 * | 12/2013 | Herrala | ..................... | G01S 1/68 370/338 |
| 9,113,343 B2 * | 8/2015 | Moshfeghi | ............ | G01S 5/0263 |
| 9,404,996 B2 * | 8/2016 | Yamada | .................... | G01S 5/14 |
| 2004/0027251 A1 | 2/2004 | Sharony | | |

(Continued)

*Primary Examiner* — Chuong P Nguyen
(74) *Attorney, Agent, or Firm* — Roberts Foster LLP

(57) ABSTRACT

A system for computing accurate position location coordinates of tags used for tracking assets and people include a first network of access points to help compute a first approximation of the tag position location, a second network of access points underlying the first network for fine position location determination, and a position location server for controlling the second network of access points and computing position location based on round trip delay measurements between tags and the access points.

9 Claims, 10 Drawing Sheets

(56) References Cited

U.S. PATENT DOCUMENTS

| | | |
|---|---|---|
| 2007/0103303 A1 | 5/2007 | Shoarinejad |
| 2009/0121867 A1 | 5/2009 | Park |
| 2010/0073235 A1 | 3/2010 | Smith |
| 2010/0074133 A1 | 3/2010 | Kim |
| 2010/0135178 A1* | 6/2010 | Aggarwal ............ G01S 5/0205 370/252 |
| 2012/0113902 A1 | 5/2012 | Shoarinejad |
| 2015/0271643 A1* | 9/2015 | Jalali .................... H04W 4/023 455/456.1 |
| 2015/0304810 A1* | 10/2015 | Jalali ...................... H04W 4/02 370/336 |
| 2015/0319572 A1* | 11/2015 | Jalali ................. G06K 7/10009 455/456.1 |
| 2016/0054429 A1* | 2/2016 | Jalali .................... G01S 5/0294 342/451 |
| 2017/0041763 A1* | 2/2017 | Jalali ........................ G01S 5/14 |

* cited by examiner

SYSTEMS AND METHODS OF LOCATION AND TRACKING

CROSS-REFERENCE

This application claims priority to U.S. Provisional Patent Application No. 61/944,115, entitled: "Systems and Methods of Location and Tracking" filed Feb. 25, 2014, the contents of which are incorporated by reference in its entirety.

FIELD

The invention generally relates to location and tracking and more specifically to tracking position of assets using first and second networks.

BACKGROUND

A number of systems have been developed and deployed to locate and track the position of people and assets collectively ("assets") in local area environments such as office buildings, hospitals, shopping malls, and hotels, industrial environments such as refineries, oil rigs, and manufacturing facilities. Many of these systems, however, provide position accuracy of within a few meters using an existing Wi-Fi or Bluetooth network.

Position location accuracy of a few meters may suffice in some applications such as locating a tool in an industrial environment such as in a refinery, in an aircraft hangar etc. In some applications, however, accuracy of less than one meter is required. Many of the applications requiring high position location precision involve establishing close association of two assets (e.g. two persons, a person and some equipment or two pieces of equipment. In many cases, it is not necessary that the precise location of a person or object (i.e. asset) be known, but rather the association of the two is needed which requires determining that an asset is in the proximity of another asset. For instance, hospitals would like to record if a doctor or a nurse has visited a certain patient during the day. In this application, what is important is to record that the doctor/nurse was in proximity of the patient at certain time. The position location accuracy requirement for this case is often referred to as "room level" accuracy meaning that the doctor/nurse must be located in the right room. However, as mentioned above if the objective is to ensure that the doctor/nurse visited the patient during the day, then it is really detecting the close proximity of the doctor/nurse and the particular patient that is needed and not necessarily accurately locating the doctor/nurse. In rooms with multiple beds, the doctor/nurse must be associated with the right patient in that room. Another example of room level accuracy is in hotels where it is desirable to locate a maid in the right room in case there is an emergency, or to be able to verify that someone has cleaned a specific room.

One manufacturing use case is to adjust the torque of a wrench depending on the specific manufacturing part the tool is trying to fasten. This again is a case of detecting proximity of the tool and a manufacturing part. Another example of the need to detect proximity is to ensure that certain medical equipment such as an IV pump is in fact attached to a certain patient. Another example is to register that doctors/nurses have washed their hands prior to certain functions such as visiting a patient. This application again requires detection of close proximity of the doctor/nurse and a sink/disinfectant station.

Another application for accurate position location in retail environment is to direct the customer to the right location in the store for a given item. Here one would want a very accurate positioning scheme to navigate the customer through the store so that the customer gets very close to the item he/she is searching.

SUMMARY OF THE INVENTION

Location determination systems and methods comprises first tags placed on assets or on people, referred to as mobile tags, for tracking the position location of the asset; a first network for obtaining a first approximate position location coordinates of the mobile tags; second tags placed on zones referred to as zone tags and a second network underlying the first network and making round trip delay measurements between the mobile tags and the zone tags; and a position location server that determines the first and second position location estimates using measurements sent by the mobile and zone tags.

In one embodiment, systems and methods are described for automatically finding the position coordinates of zone tags. The system and methods include, manually initializing the position location coordinates of a limited number of zone tags referred to as configured zone tag, making round trip delay (RTD) measurements between zone tags and the configured zone tags, computing and configuring the position coordinates of the zone tags using the RTD measurements between zone tags and configured access points as well as the position location coordinates of the configured zone tags, and adding the newly configured zone tags to the list of configured zone tags.

In another embodiment, system and methods for aligning the frame timing of the aforementioned zone tags within a few of micro-seconds. The system and methods include, reference zone tags to broadcast a message that includes the reference zone tag's frame timing, the zone tags in the coverage area of the reference zone tag, referred to as neighboring zone tags, to receive the broadcast message from reference zone tags, the neighboring zone tags to estimate their frame timing offset with respect to that of the reference zone tags and to align their frame timing to that of the reference zone tags within a few of micro-seconds, and the zone tags that corrected their frame timing to act as new reference zone tags, and to broadcast a message to their neighboring zone tags whose frame timing is not yet corrected.

In another embodiment, system and methods for clearing the frequency channel for round trip delay measurements is described. The system and methods includes a position location sever that schedules a measurement time interval for each mobile tag, zone tags wake prior to the beginning of the scheduled measurement period, contend for and get access to the channel prior to the beginning of the measurement period, the position location server informs the mobile tags of the measurement time interval, zone tags send a preamble message to each mobile tag, mobile tag detects the preamble message sent by the zone tag, and mobile tags send a message back to the zone tag for round trip delay measurement, and zone tags send the measured round trip delay values between mobile tags and zone tags to the position location server.

BRIEF DESCRIPTION OF THE DRAWINGS

Following drawings in conjunction with detailed description help clarify the features and advantages of the present disclosure. In the figures, similar components are identified using the same reference label. Multiple instances of the same component in a figure are distinguished by inserting a dash after the reference label and adding a second reference label.

DETAILED DESCRIPTION

Figure 1:
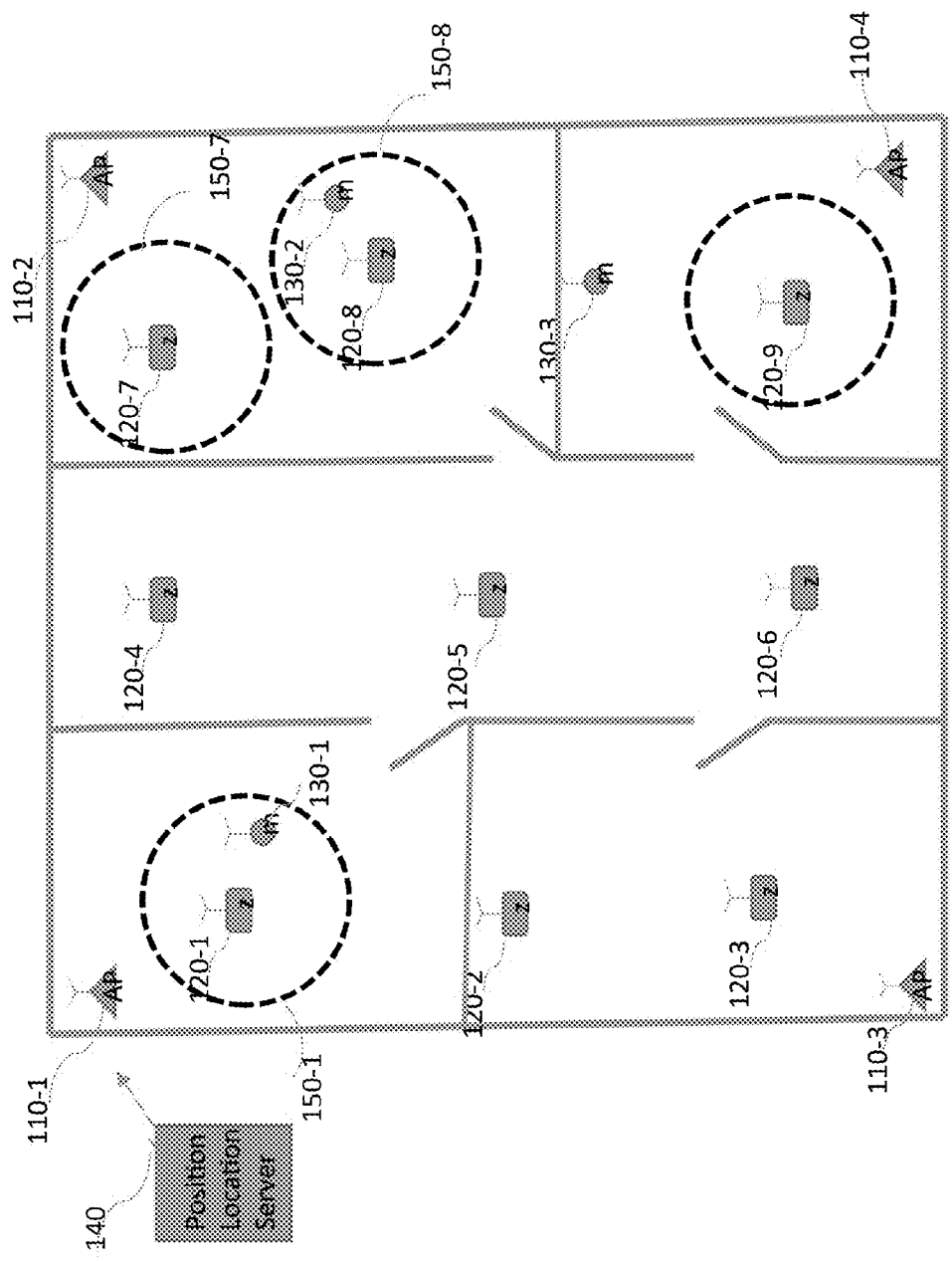
FIG. 1 is a block diagram of an exemplary architecture for a position location system and its constituent components in accordance with the principles of the present invention.

The FIGURES and text below, and the various embodiments used to describe the principles of the present invention are by way of illustration only and are not to be construed in any way to limit the scope of the invention. A Person Having Ordinary Skill in the Art (PHOSITA) will readily recognize that the principles of the present invention maybe implemented in any type of suitably arranged device or system. Specifically, while the present invention is described with respect to use in Wi-Fi networks and Access Points therein, a PHOSITA will readily recognize other types of networks and other applications without departing from the scope of the present invention.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by a PHOSITA to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Many cases that require high precision position location can be viewed as a proximity detection problem. Proximity detection is addressed first and then the invention is expanded to other use cases. In a hospital application, we define certain locations such as hospital beds as zones and assign a tag to these zones, referred to as a zone-tag or "z-tag". Tags that are placed on people or assets collectively ("assets") for the purpose of tracking the position of the assets are referred to as a mobile tag or "m-tag". If it is determined that an asset (e.g. doctor) is in the zone defined around a bed then that is recorded rather than determining the exact location of where the doctor is standing. Zones apply to many use cases such as parts of hospitals, supermarkets, shopping malls, parts of hotels, and some manufacturing locations.

A z-tag may be attached somewhere in a zone or close to a zone such as to the bed or on the ceiling above a bed, or on a wall close to the bed, or to the patient. The problem of deciding whether or not a doctor/nurse has visited a patient may be solved by determining and recording the zones that the doctor/nurse has been in at different times of the day. If the z-tag is attached to the bed or the patient or just above the bed then the problem of finding the closest zone to the doctor/nurse becomes the problem of finding the closest z-tag to the doctor/nurse. In cases where the z-tag is not attached to the bed/patient then the system uses measurements from multiple z-tags close to the patient and triangulates the measurements to find the coordinates of the location the doctor/nurse is in.

In a supermarket example where the merchant intends to send ads/coupons or other information to a customer when a customer is close to certain products, certain parts of the isle may be defined as zones. Then, as the customer is walking in the supermarket the problem of positioning is reduced to finding the zone in which the customer resides at a given time. The right zone may have to be determined by triangulating measurements from multiple z-tags. In other words, z-tags need not identify a zone by just one measurement from each z-tag rather, z-tags can be positioned around an area that needs high precision positioning and measurements from multiple z-tags may be made to find the zone that the person or asset is in. Therefore, the z-tags need not be placed in exact locations.

z-tags may be very low cost devices that are easy to deploy and to manage, and treat certain areas such as hospital rooms, beds, and parts of retail environment as assets. Since in certain applications there may be thousands of m-tags used in an enterprise, installing z-tags in certain locations may be viewed as tagging some areas of the enterprise. The z-tags can be relatively inexpensive but preferably with a larger battery or an external power supply.

Reference is now made to FIG. 1 depicting a block diagram of an exemplary architecture for a position location system and its constituent components in accordance with the principles of the present invention. Access points 110-j, where j is an integer distinguishing different access points in the network (e.g. 110-1 through 110-4), are preferably Wi-Fi Access Points ("APs") previously deployed in a premise for the purpose of communications among devices and with the internet. The z-tags are labeled by 120-j, and the m-tags by 130-j, where j is an integer distinguishing different occurrences of the same device/component. As described below, the position location server 140 schedules Round Trip Delay (RTD) measurements between the m-tags and z-tags, carries out triangulation of the measured RTD values to determine the position of the m-tag, and sends the computed position location to other parts of the network (not shown in FIG. 1).

The deployment of z-tags is preferably made by a scheme whereby the z-tags find their own locations after installation, movement of any z-tags is detected and the new location of the z-tags is found automatically. There are a number of benefits in deploying a network of z-tags. As described above, using only the Wi-Fi APs that are deployed for communications do not provide high position accuracy, as the number of Wi-Fi APs may not be enough or they may not have the right waveform/technology. Additional APs or sensors with a high performing and optimized positioning technology are needed. Deploying a separate network of z-tags overcomes the limitation that existing Wi-Fi networks may not be properly configured in terms of the AP locations for positioning. Moreover, using only the existing Wi-Fi network for positioning location would be cumbersome as an IT group changes the location of the APs, or makes changes to the Wi-Fi network and the positioning system would need to be informed requiring close coordination with the IT group. An additional network of z-tags under the control of the positioning service provider results in a more robust service. As described in more detail below, a methodology for the z-tags to automatically determine their position locations is presented.

Figure 2:
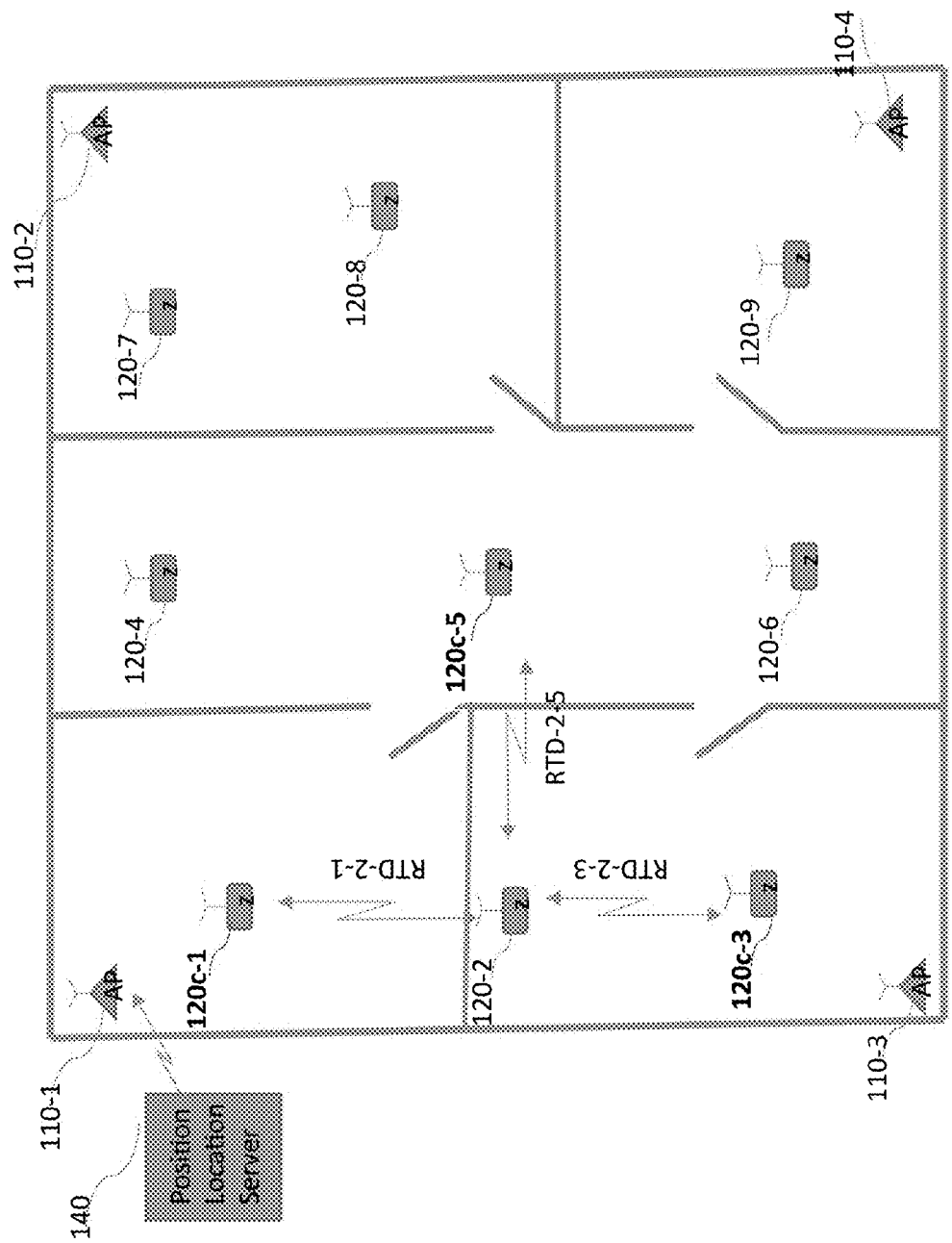
FIG. 2 is a block diagram describing computing the position coordinates of zone tags automatically in accordance with the principles of the present invention.

Reference is now made to FIG. 2 depicting a block diagram describing computing the position coordinates of zone tags automatically in accordance with the principles of the present invention. Preferably, the position locations of at least three z-tags are manually configured in FIG. 2 depicted as configured z-tags 120c-1, 120c-3 and 120c-5. The position location of other z-tags in the network then are computed using the location of the at least three configured z-tags as is described herein below. In general, at least three z-tags are preferably configured since z-tags could be deployed at different heights and therefore three coordinates of the x, y and z axis would be needed to position a z-tag within a room. If only three configured z-tags are used then there may be cases where there are multiple solutions for the position of the z-tag. Then, more than 3 RTD measurements help resolve any ambiguity. Furthermore, more measurements help mitigate effects of noisy measurements. As shown in FIG. 2, the first z-tag whose position is determined is 120-2. The first step in determining the coordinates of 120-2 is to measure the RTD from 120-2 to each of the configured z-tags 120c-1, 120c-3, and 120c-5. The at least 4 RTD measurements are sent to the position location server 140. The position location server 140 computes the coordinates of the 120-2 z-tag using the information on the coordinates of the configured z-tags. Once the coordinates of 120-2 are computed, z-tag 120-2 may be added to the list of configured z-tags which can be used to determine coordinates of the other z-tags.

In the preferred embodiment, z-tags use relatively wideband waveforms of 80 MHz to 160 MHz, or potentially two separate 160 MHz waveforms in non-contiguous bands. In unlicensed 5 GHz U-NII band, the z-tags and m-tags may transmit at relatively high transmit power of about 200 mWatt resulting in high SINR (Signal to Interference plus Noise) at the receiver. The combination of wide bandwidth of as high as 160 MHz and high SINR make possible ranging accuracy as good as 0.1 meters or better at least in line of sight environments. Note that since the z-tags are not attached to people they do not incur any body loss. Moreover, the z-tags can have a small external antenna, and could have a few dBs of more gain than the m-tag antennas. Therefore, links between z-tags have much better link budget than the m-tag to z-tag links. This translates into much higher SINR between the z-tags and much more accurate RTD measurements between the different z-tags, and therefore more accurate position location estimate for the z-tags. Another technique that can be used to further improve the accuracy of the RTD measurements, and therefore the accuracy of estimates of the z-tag coordinates, is to carry out multiple RTD measurements between two z-tags and to average the multiple RTD measurements. There can be cases where the LOS path may be attenuated by some obstruction such as a person's body, some furniture or other obstruction. In order to accurately estimate the distance between two z-tags, RTD measurements are based on the earliest signal arrival and not the strongest signal.

Another aspect of the present invention that assists in measuring the position of z-tags accurately is that each z-tag can measure RTD with a number of other z-tags because as discussed above, the link budget between z-tags is better than the link budget between m-tag and z-tags. In other words, the z-tag network has redundant RTD measurements which may be used to eliminate inaccurate RTD measurements that suffer from non-resolvable multipath.

Figure 3:
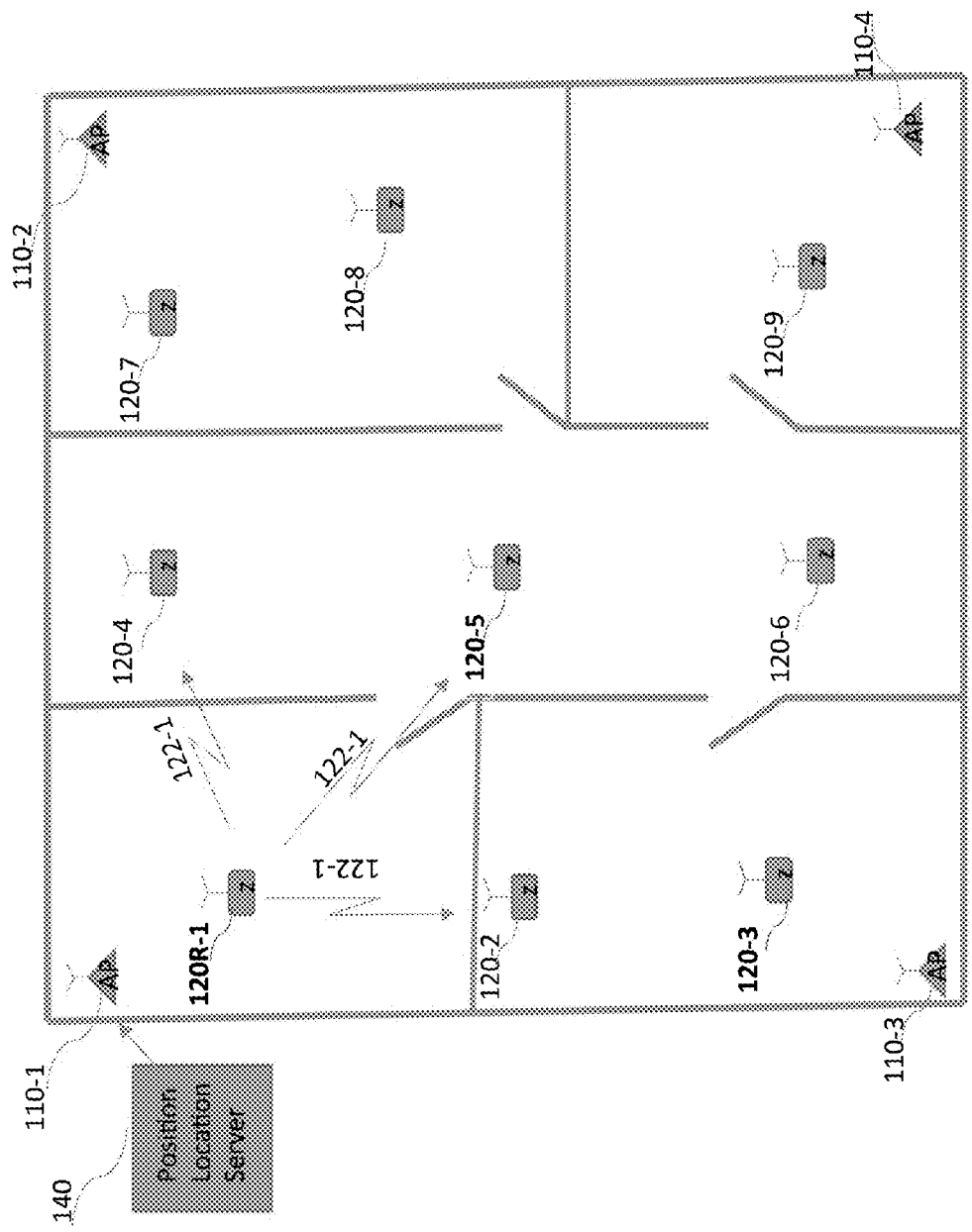
FIG. 3 is a block diagram describing aligning frame timing of zone tags in accordance with the principles of the present invention.

Two types of z-tags are contemplated, ones that are plugged to power outlets and ones that are run on battery but perhaps with batteries of a few thousand m-Amp hour of capacity. The battery version of the z-tags makes deployment of z-tags easier in certain applications where there is no access to power plugs such as hospital beds or retail racks. Therefore, to extend the battery life of m-tags and the battery operated z-tags, the m-tag and battery operated z-tag preferably have a sleep mode and only occasionally wake up to make range measurements. Accordingly, the z-tags and m-tags may need to be aligned at the frame level (within a few of micro-seconds) so that they can wake up and detect preamble messages for ranging purposes. The position location algorithm steps are described below. In the sequel, Wi-Fi AP and Wi-Fi network refers to the existing Wi-Fi network in a given enterprise.

z-Tag Approximate Frame Timing Alignment.

z-tags are aligned at the frame level, within a few of micro-seconds. The purpose of his coarse alignment is so the z-tags and m-tags may go to sleep and then wake up periodically to carry out RTD measurements. This alignment is done when z-tags are initially deployed and then repeated periodically to maintain the alignment. One of the z-tags, z-tag 120-1 in FIG. 3 labeled 120R-1, is chosen as the reference z-tag to which other z-tags align their frame timing. The alignment process begins by z-tag 120R-1 broadcasting a message 122-1. Message 122-1 has a field that identifies the frame timing of z-tag 120R-1. Any z-tag that receives message 122-1, uses the frame timing in message 122-1 to adjust their frames to align with frame timing of z-tag 120R-1. In the next step, all z-tags which aligned frame timing to that of z-tag 120R-1, as just described, in turn act as new reference z-tags and broadcast alignment messages. z-tags that have not yet aligned their frame timing, use the newly received alignment message to align their frame timing. This process continues until all z-tags have aligned their frame timing to a neighboring z-tag.

m-Tag.

Figure 4:
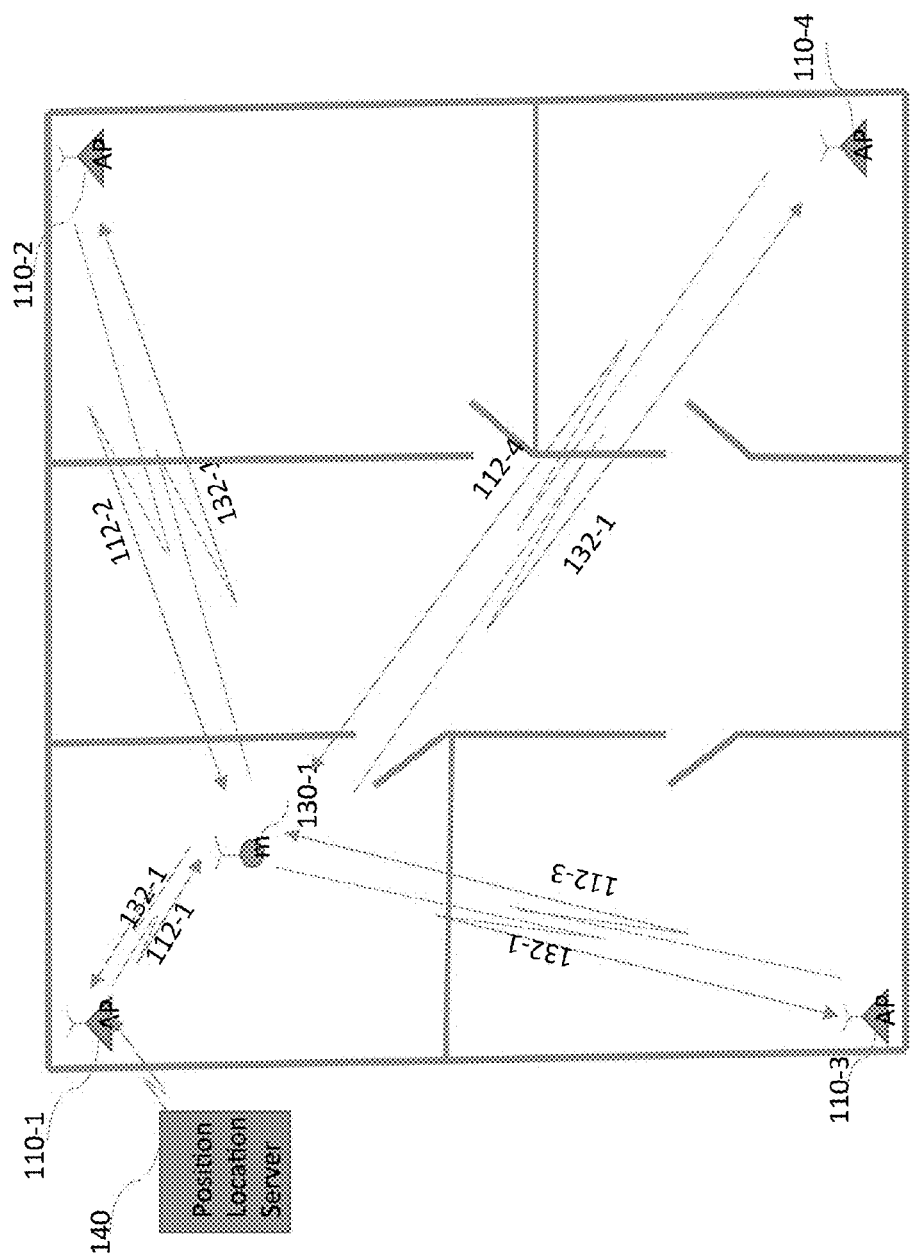
FIG. 4 is a block diagram describing computing a first position location estimate of a mobile tag in accordance with the principles of the present invention.

Reference is now made to FIG. 4, a block diagram describing computing a first position location estimate of a mobile tag in accordance with the principles of the present invention. m-tags search for a beacon from the existing Wi-Fi network APs 110-1, 110-2, 110-3 and 110-4, and associate with a Wi-Fi AP, 110-1, to connect to the internet.

m-Tag's Rough Position Location Estimate.

As shown in FIG. 4, the m-tag first makes RSSI (Received Signal Strength Indicator) or RTD measurements with a number of APs of the existing Wi-Fi network, APs 110-1, 110-2, 110-3 and 110-4 in FIG. 4, and uses these estimates to either make a rough position location estimate, or to send the measurements to the position location server 140 which makes a rough position estimate for the m-tag. Note that the rough position of the m-tag may be the list of z-tags that are close to the m-tag. In other words, if the position of the legacy Wi-Fi APs is not known or is difficult to find, then the position location server 140 will use information on relative position of z-tags and Wi-Fi AP SSIDs to determine where roughly an m-tag is relative to the z-tags. In many cases, it may be difficult to get a good data base of Wi-Fi AP position locations such as in shopping malls. Therefore, the rough position of an m-tag may be the list of z-tags that are close to the m-tag.

m-Tag Approximate Frame Timing Alignment to z-Tags.

Position location server 140 assigns the m-tag to the nearest z-tag and instructs the m-tag to align its frame timing to the z-tag using the same scheme described above for aligning z-tags. For instance, in FIG. 4, m-tag 130-1 is assigned to z-tag 120-1 to which to align.

RTD Measurement Period Scheduling.

A protocol is needed to schedule time and bandwidth for RTD measurements to minimize interference between the positioning and communication system transmissions in the unlicensed U-NII band. At the beginning of the measurement period shown in FIG. 6A, the z-tag contends to reserve bandwidth. One contention scheme uses Wi-Fi's CSMA/CA (Carrier Sense Multiple Access/Collision Avoidance) scheme whereby the z-tag senses the channel and once it finds the channel is idle, it may attempt to seize the channel by sending a message. According to the CSMA/CA scheme of Wi-Fi, each device must ensure that the channel is idle for a certain "inter-frame spacing" time interval before trying to seize the channel. One way of speeding up the z-tag channel acquisition is for the z-tag to send a message before the end of the required inter-frame spacing idle time interval so that other devices do not have the opportunity to seize the channel. Once the z-tag has seized the channel, it may use CCA (Clear Channel Assessment) and RTS/CTS (Request To Send/Clear To Send) protocols of the Wi-Fi standard to reserve the channel for a long enough time interval to complete RTD measurements with all m-tags in its vicinity. According to RTS/CTS scheme z-tag would send an RTS message to seize the channel which would also specify the length of time the z-tag wants to reserve the channel. The Wi-Fi AP would send a CTS back confirming the requested channel reservation length. As shown in FIG. 6A, the position location server 140 defines a measurement cycle of duration T seconds. At the beginning of each cycle, a time interval T1 is allocated to RTD measurements. In one aspect of the m-tag measurement scheduling scheme, as shown in FIG. 6A, the position location server 140 assigns time epochs tj, $1<j<n$, n number of m-tags in z-tag's coverage area, and each m-tag 110-j wakes up at time epoch tj to search for a preamble message. Assigning specific time instants for the m-tags to wake up helps reduce the power consumption of the m-tags. In another aspect of the m-tag measurement scheduling, all m-tags that need to make RTD measurements with a specific z-tag wake all at the beginning of the measurement period T1 and go back to sleep when they have made their RTD measurements. For instance, in FIG. 5, the three z-tags 120-1, 120-2 and 120-4 need to make RTD measurements with m-tag 130-1. z-tags 120-1, 120-2 and 120-4 are scheduled by the position location server 140 to make measurements with m-tag 130-1 in the corresponding order. Therefore, first z-tag 120-1 wakes up a certain time instant $-t0$ prior to the beginning of the measurement interval to start contending for the channel so that there is enough time to acquire the channel prior to the beginning of the measurement period T1. In FIG. 6A, z-tag 120-1 acquires the channel at time $-\tau 1$. But, as shown in FIG. 6B, the z-tag 120-1 may end up acquiring the channel after the measurement period has started in which case the m-tag 130-1 will stay up during the measurement period T1 and search for preambles. If the m-tag does not find the preamble message at a specific time it expects the message, the m-tag will stay on longer and continue searching until it detects the preamble message or a timer expires. The RTD measurements of m-tag 130-1 and z-tags 120-1, 120-2 and 120-4 are scheduled by the position location server during the at least three different measurements periods, one for each z-tag.

Zone Determination or Fine Position Calculation.

Figure 5:
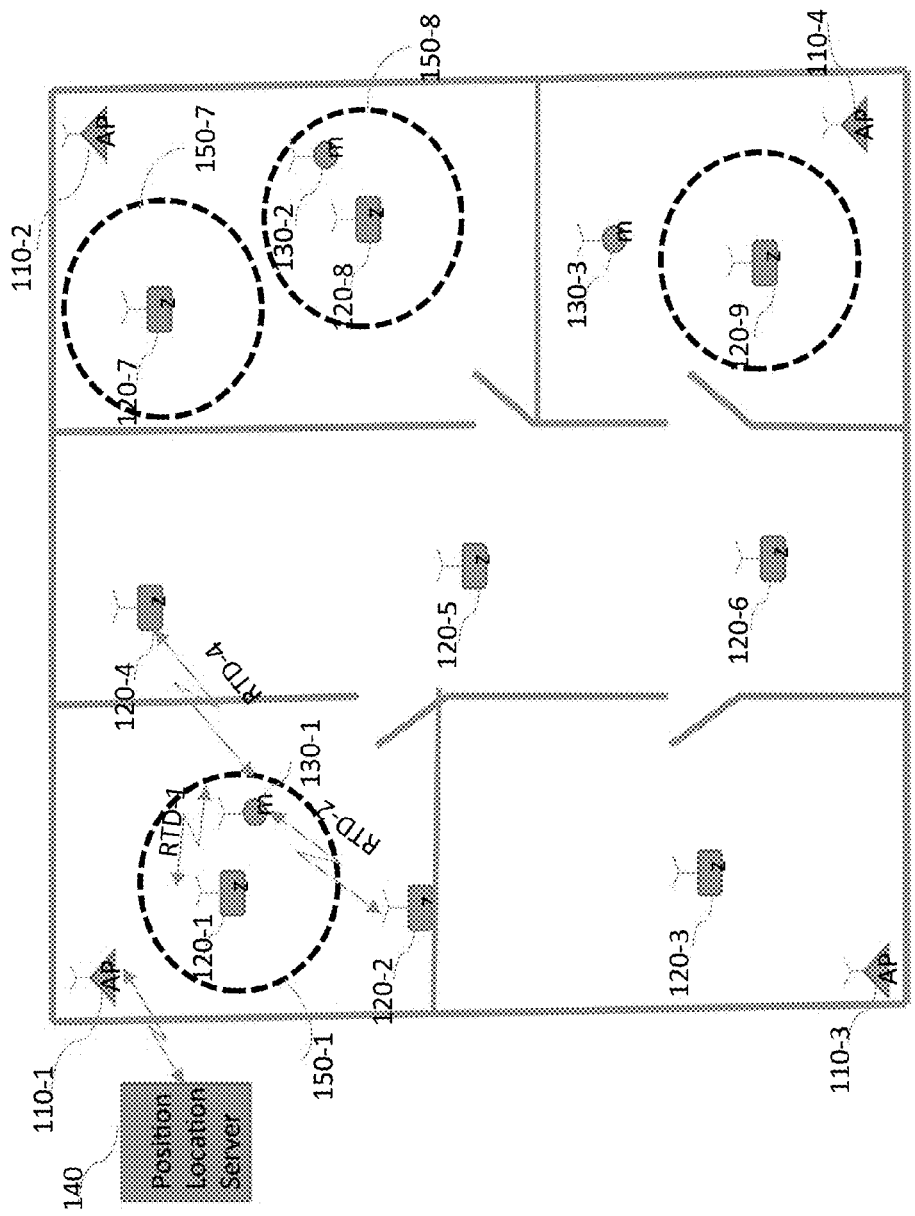
FIG. 5 is a block diagram describing computing a second more accurate position location of a mobile tag in accordance with the principles of the present invention.
Figure 6A:
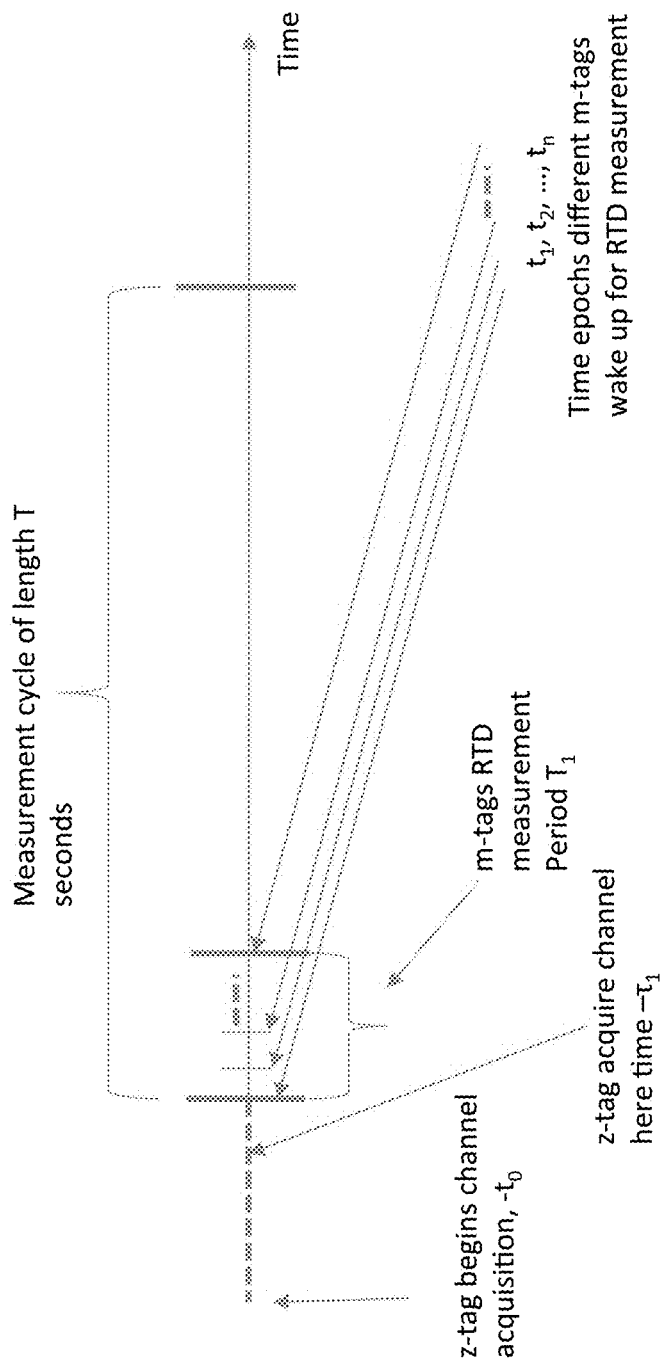
FIG. 6A is a block diagram describing the scheduling time line for round trip delay measurement in accordance with the principles of the present invention.
Figure 6B:
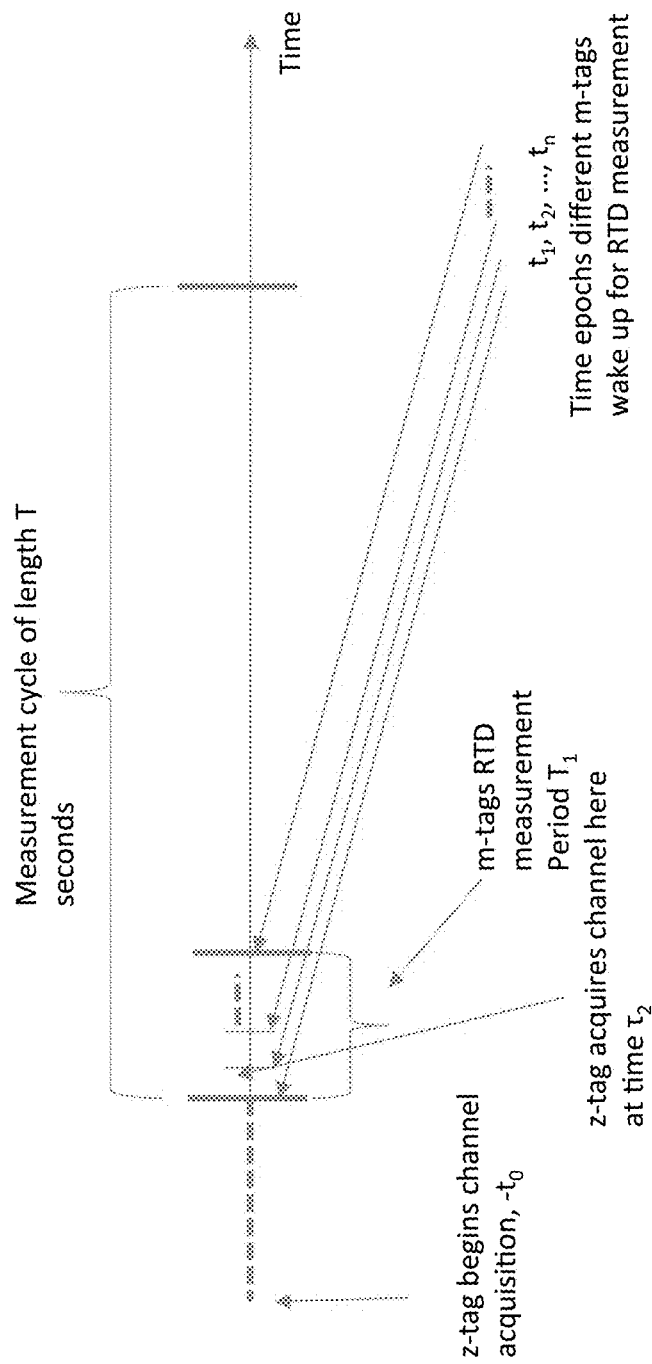
FIG. 6B is a block diagram describing the scheduling time line for round trip delay measurement in accordance with the principles of the present invention.

Reference is now made to FIG. 5, a block diagram describing computing a second more accurate position location of a mobile tag in accordance with the principles of the present invention. The position location server 140 identifies at least the three z-tags 120-1, 120-2 and 120-4 with which the m-tag 130-1 needs to make RDT measurements. Once each of the RTD measurements with 120-1, 120-2 and 120-4 are made, then the position location server checks to see if the RTD measured from m-tag to each of the z-tags is smaller than that of the zone defined around each z-tag. If the RTD falls within one of the z-tag regions, as is the case for m-tag 130-1 and z-tag 120-1, then the position location server associates m-tag 130-1 and z-tag 120-1 and further triangulation of the three RTD measurements is not needed to find the precise location of m-tag 130-1. However, in applications where the location coordinates of the m-tag is needed then the at least 3 RTD measurements are triangulated to determine the coordinates of the m-tag.

Position Update Rate Adjustment.

In order to conserve battery life, the position location update rate of the m-tag needs to be minimized. The m-tag attached to assets would have a motion sensor which is used to initiate a position update when the sensor detects motion. Therefore, when the m-tag is stationary the update rate is very small. For m-tags on handsets or an assets that are carried by a person who is moving, or m-tags on a moving equipment such as cart or a wheelchair etc. we could control the update rate by filtering the outputs of an accelerometer. Once the fine position of the handset/asset is determined per above steps then the position should be updated if the person/asset has moved to a new location. If a person (a doctor or a nurse) is in his/her office or visiting a patient they would still be moving but in a localized area. So the output of the accelerometer filter should be compared against a threshold and if the filter output indicates that the change in location is below a predefined threshold then the position is not updated.

Figure 7:
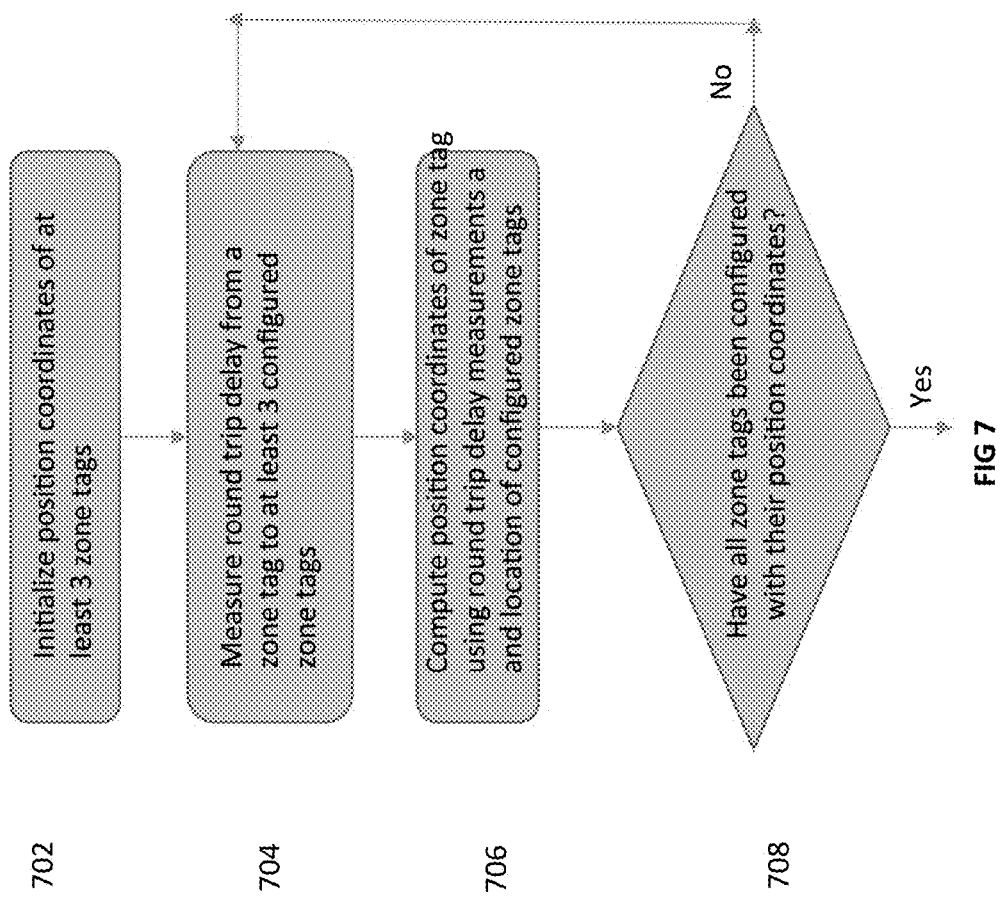
FIG. 7 is a flow chart for automatically computing and configuring the position location coordinates of zone tags in accordance with the principles of the present invention.

Reference is now made to FIG. 7, a flow chart for automatically computing and configuring the position location coordinates of zone tags in accordance with the principles of the present invention. Step 702 initializes the position location coordinates of at least three zone tags, referred to as configured zone tags. In step 704, one of the zone tags in the vicinity of the configured tag measures round trip delay to at least 3 configured zone tags. In step 706, the position location server 140 computes the position of the zone tag and adds the zone tag to the list of configured the zone tag. Step 708 checks if all zone tags have been configured. If not, the process move back to step 704.

Figure 8:
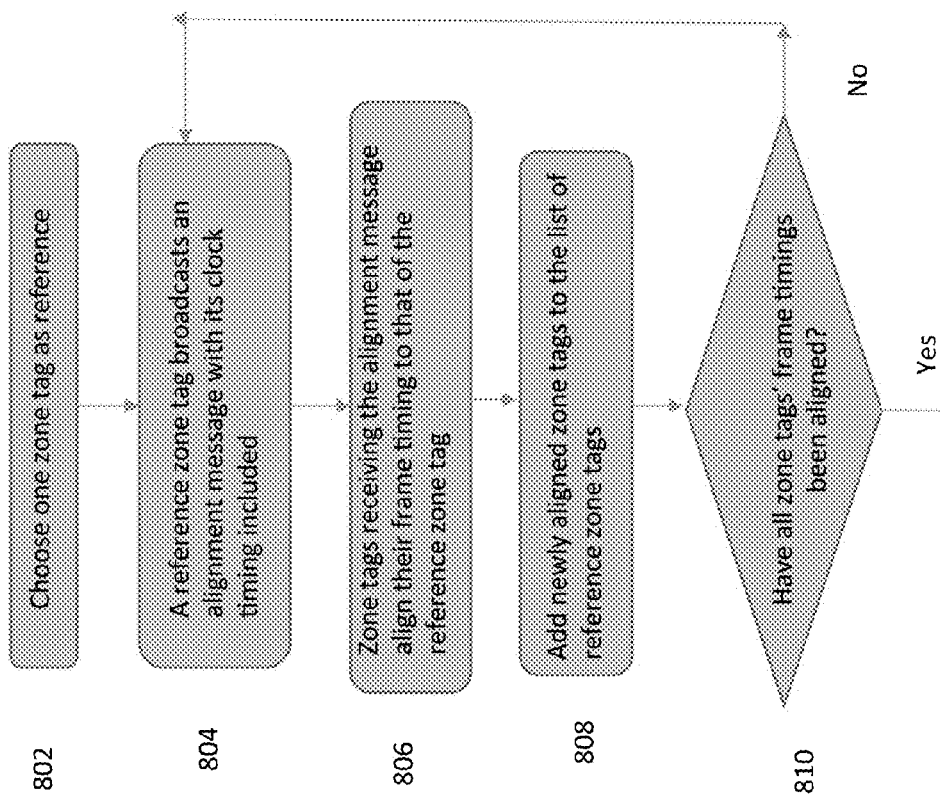
FIG. 8 is a flow chart for aligning the frame timing to zone tags in accordance with the principles of the present invention.

Reference is now made to FIG. 8, a flow chart for aligning the frame timing to zone tags in accordance with the principles of the present invention. In step 802, one of the zone tags is chosen to be the reference zone tag to start the process. In step 804, a reference zone tag broadcast an alignment message with its local frame timing. In step 806, all zone tags that have received the alignment message from a reference zone tag align their frame timing to that of the reference zone tag. In step 808, all zone tags that have aligned their frame timing to a reference zone tag are added to the list of reference zone tags. Step 810 checks if all zone tags have been aligned. If all zone tags have not been aligned, the process moves back to step 804.

Figure 9:
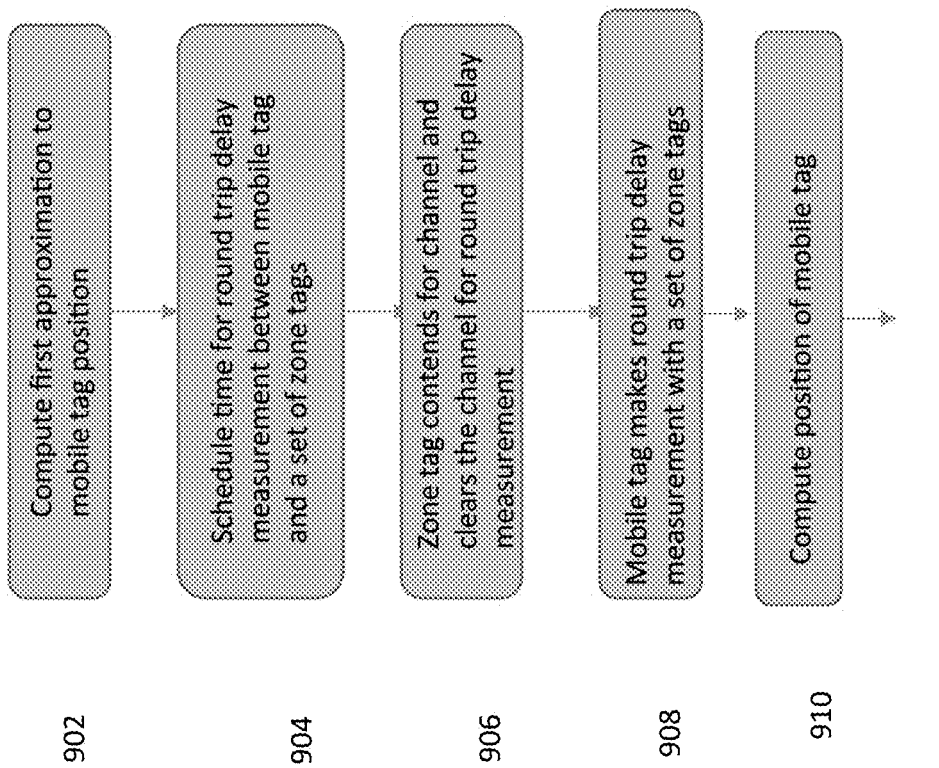
FIG. 9 is a flow chart of steps in computing the position location of mobile tags in accordance with the principles of the present invention.

Reference is now made to FIG. 9, a flow chart of steps in computing the position location of mobile tags in accordance with the principles of the present invention. Step 902 determines a first approximation to the position of a mobile tag using a first network of Wi-Fi access points. In step 904, a set of zone tags near the mobile tag are identified. Step 904 schedules time for round trip delay measurement between the mobile tag and the set of identified zone tags. In step 906, the zone tag contends for the channel and clears the channel of other users to measure round trip delay during scheduled time. In step 908, mobile tag and zone tags make round trip delay measurements and report the measurements to the position location server. In step 910, the position location sever computes the position of the mobile tag using the measured round trip delay values and position coordinates of z-tags.

Therefore, the positioning system is composed of two tiers, first tier gets a rough location estimate using existing Wi-Fi network, and the second tier fine tunes the m-tag position and tracks its position.

Following the preamble structure of 802.11 ac packets the size of the preamble and other overhead is about 50 μsec. Then, each RTD measurement will take 100 μsec as you need to transmissions to complete and RTD. Depending on the situation you need one to three RTD measurements for a position fix. So assume four RTD measurements to be conservative. Then, each position fix will be 400 μsec. The Wi-Fi AP that has the m-tag and z-tag pair making RTD measurements in its coverage will not be able to send data to Wi-Fi devices during the 400 μsec RTD measurement process. Since the m-tag makes RTD measurements with one z-tag at a time, only one Wi-Fi AP gets impacted during the RTD measurement of a given m-tag. Since the coverage area of a Wi-Fi AP a radius of less than 30 feet then even in cubicle environments there would be about 80 cubicles or people. Therefore, even if one wanted to track 80 people at say a rate of once every five seconds then the total time the m-tags in the coverage area of one AP make measurements is 80×400/5=6400 μsec or 6.4 msec. Note that since assets are mostly stationary their update rate is much less than that of people. Therefore, every second at most ten msec needs to be allocated to RTD measurements. This is only 1% of the total Wi-Fi AP time and has no impact to the data communication capacity.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A location determination system having mobile tags and zone tags comprising:
   first network configured to obtain first approximate position location coordinates of the mobile tags;
   second network underlying the first network, configured to obtain second position location estimates as round trip delay measurements between the mobile tags and the zone tags; and,
   a position location server configured to determine the first position location coordinate of said mobile tags and second position location estimates of said zone tags using measurements sent by the mobile and zone tags, wherein position location coordinates of at least three zone tags are manually initialized as configured zone tags and wherein
   configured zone tags make round trip delay RTD measurements with non-configured zone tags and send measurements to position location server; and the position location server computes the position coordinates of the non-configured zone tags using the RTD measurements between the zone tags and coordinates of the configured zone tags, and adds the non-configured zone tags to the list of configured zone tags.

2. The system of claim 1, further comprising:
   a reference zone tag configured to broadcast a message carrying frame timing information to neighboring zone tags, neighboring zone tags configured to receive the broadcast message from the reference zone tags,
   wherein the neighboring zone tags are configured to estimate their frame timing offset with respect to that of the reference zone tag and aligning their frame timing to that of the reference zone tag; and
   zone tags that correct their frame timing act as new reference zone tags, configured to broadcast messages to their neighboring zone tags whose frame timing are not yet corrected.

3. The system of claim 2, wherein the position location server is configured to associate each mobile tag to a nearby zone tag; and the mobile tag receives a frame alignment message from the associated zone tag and aligns its frame timing to that of the associated zone tag.

4. The system of claim 2 wherein the mobile tags and zone tags are configured to periodically carry out frame timing alignment.

5. A location determination system having mobile tags and zone tags comprising:
- first network configured to obtain first approximate position location coordinates of the mobile tags;
- second network underlying the first network, configured to make second position location estimates as round trip delay measurements between the mobile tags and the zone tags; and,
- a position location server configured to determine the first and second position location estimates of said mobile tags using measurements sent by the mobile and zone tags, wherein the position location server is configured to schedule a measurement time interval for each mobile tag, to inform the mobile tags of the measurement time interval using the first network of the measurement interval, wherein the zone tags are configured to wake prior to the beginning of the scheduled measurement period, and to contend for and get access to a channel, and wherein the zone tags are configured to send a preamble message to each mobile tag, the mobile tag configured to detect the preamble message sent by the zone tags, and configured to send a message back to the zone tags for round trip delay measurement, and send the measured round trip delay values between mobile tags and zone tags to the position location server.

6. The system of claim of 5 wherein the zone tags are configured to seize a channel before the end of the interframe spacing time interval during channel idle times, to speed up channel acquisition time.

7. The system of claim 5 wherein the position location server is configured to schedule multiple round trip delay measurements between certain zone tags and mobile tags, and averages the multiple round trip delay measurements to improve the accuracy of the measurement.

8. The system of claim 5 wherein the position location server is configured to uses the measured round trip delay values to determine whether or not the mobile tag is inside the zone of a zone tag, and the position location server is configured to compute the coordinates of the mobile tag using the round trip delay measurements between mobile tag and a set of zone tags and the coordinates of the zone tag positions.

9. The system of claim 8 wherein the position location server is configured to filter a sequence of consecutive position location coordinates to determine if the mobile tag's position has changed more than a certain threshold, and to increase the position location update rate if the mobile tag's position has changed by more than a threshold, and to reduce the position update rate if the mobile tag's position has not changed by more than a threshold.

* * * * *